UNITED STATES PATENT OFFICE.

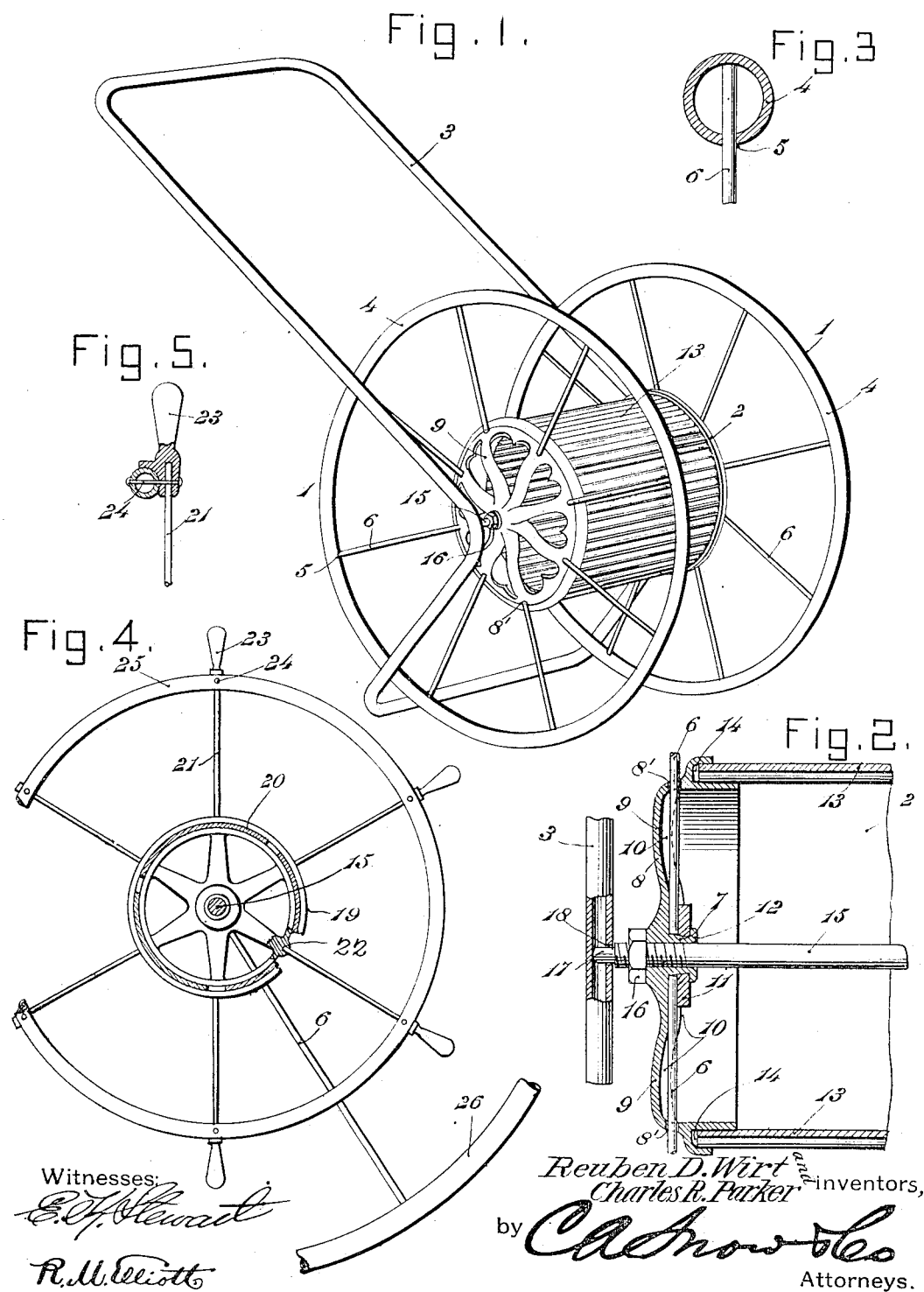

REUBEN D. WIRT AND CHARLES R. PARKER, OF PHILADELPHIA, PENNSYLVANIA.

HOSE-REEL.

No. 818,990.  Specification of Letters Patent.  Patented April 24, 1906.

Application filed July 17, 1905. Serial No. 270,027.

*To all whom it may concern:*

Be it known that we, REUBEN D. WIRT and CHARLES R. PARKER, citizens of the United States, residing at Philadelphia, in the county of Philadelphia and State of Pennsylvania, have invented a new and useful Hose-Reel, of which the following is a specification.

This invention relates generally to hose-reels, and more particularly to that class adapted for use as lawn-hose reels.

The object of the invention is to simplify the construction and render more durable the hose-drum and improve its manner of connection with the supporting axle and frame, whereby with the minimum of material the greatest durability and strength is secured.

With the above and other objects in view, as will appear as the nature of the invention is better understood, the same consists in the novel construction and combination of parts of a hose-reel, as will be hereinafter fully described and claimed.

In the accompanying drawings, forming a part of this specification, and in which like characters of reference indicate corresponding parts, Figure 1 is a view in perspective of one form of hose-reel embodying the feature of the present invention. Fig. 2 is a view in vertical longitudinal section through a portion of the drum and supporting-frame of the reel shown in Fig. 1. Fig. 3 is a sectional detail view, on an enlarged scale, through the wheel-rim shown in Fig. 1. Fig. 4 is a sectional view exhibiting a modified form of the invention. Fig. 5 is a sectional detail view, on an enlarged scale, through the rim of the reel-wheel shown in Fig. 4.

Referring to the drawings, and more particularly to Figs. 1, 2, and 3 thereof, 1 designates the supporting-wheels of the reel, 2 the hose-drum, and 3 the supporting-frame. The rims 4 of the wheels are by preference made of metal tubing having their separated ends properly assembled, as by brazing or in any other effective manner. The inner walls of the rims are provided with orifices 5, through which project the spokes 6, the outer ends of which bear against the interior surface of the rim, as clearly shown in Fig. 3. The inner ends of the spokes bear against the hub 7 of a drum 8, it being understood that the construction at both ends of the reel is the same, so that a description of one will serve for both. The head, as shown in Fig. 1, is preferably an open-work structure made of malleable cast-iron or any other suitable material and is provided with peripheral orifices 8', through which the spokes 6 project, as clearly shown in Fig. 2. In assembling the spokes with the rims and drum-heads they are first inserted through the orifices in the head and into engagement with those of the rim, the inner ends of the spokes bearing against the hub 7, which, as shown in Fig. 2, is slightly tapered, the arms 9 being provided on their inner faces with grooves 10, in which the spokes rest, and are thereby held against any rocking movement relatively to the head. After the spokes are thus positioned a washer 11 is placed over the hub and by a suitable tool the latter is upset or bushed, as shown at 12, thereby forcing the spokes tightly into the grooves of the arms 9, the inclined outer surface of the hub serving to force the spokes against the inner walls of the rims. After the spokes and rims are combined with each head in the manner described the body or shell 13 of the drum, which is preferably made of corrugated metal for the double purpose of strength and of affording thorough ventilation of the hose, is slipped into peripheral seats 14, formed on the heads and extending at right angles to the spokes, and an axle 15 is then inserted through the hubs, and by means of nuts 16 (one only being shown) the heads are forced tightly against the body 13, and thus clamps it positively in place. The outer ends of the axle 15 are reduced, as at 17, and engage orifices 18 on the inner sides of the members of the supporting-frame and are held in engagement therewith by the inward pressure of the frame members. As will be seen by reference to Fig. 1, the frame 3 is by preference made of a single piece of tubing bent to the appropriate shape, the ends of the tubing being secured together in any suitable manner, as by brazing or the like. By the manner of combining the spokes with the heads of the drum, as herein described, a structure of great strength and comparative lightness is secured, and, further, there will be no danger of the parts working loose from jars or vibrations incident to the passage of the reel over the ground. In shipping the reel thus described it will only be necessary to spring out the frame members to release them from engagement with the axle, and by removing the nuts 16 the axle may be detached and the heads separated from the body, and the latter may then be rolled into comparatively small compass, or where a number of reels are shipped the bodies may be nested.

In the form of the invention shown in Figs. 4 and 5 the drum-heads 19 are open-work structures, and instead of employing a single sheet of corrugated metal for the drum shell or body sections of metal 20 (in this instance three) are assembled with the rims of the heads, as by bolts or rivets, and are spaced apart to permit circulation of air. The spokes 21 of the reel are secured at their inner ends in sockets 22, formed on the outer sides of the heads, and their outer ends are inserted in sockets formed in the handles 23, which latter are secured by rivets 24 to the reel-frame 25.

In the form of the invention shown in Fig. 1 there are no reel-rims driven by handles, the first form of the invention being adapted more particularly for light hose; but where heavier hose is employed there will be handles and reel-rims combined with the drum, as shown in Figs. 4 and 5.

The ordinary traction-wheels 26 will be combined with suitable hubs in the usual manner, and as this forms no part of the present invention detailed illustration thereof is deemed unnecessary.

As will be seen in both forms of the invention, provision is made for setting up and taking down the drum, thus facilitating shipment and reducing the cost of transportation to a minimum.

Having thus described the invention, what is claimed is—

1. In a hose-reel, a drum comprising heads provided with marginal seats, a longitudinally-corrugated shell engaging the seats, and means for holding the heads assembled.

2. In a hose-reel, a drum comprising heads provided on their inner faces with grooves and at their margins with seats, a shell having its terminals engaging the seats, spokes engaging the grooves, and means for holding the heads detachably assembled.

3. In a hose-reel, a drum comprising heads having circumferential orifices, interior grooves and marginal seats, a shell having its terminals disposed within the seats, spokes passing through the orifices and engaging the grooves, and means for holding the heads detachably assembled.

4. In a hose-reel, a drum comprising heads having centrally-disposed hubs, circumferential orifices, interior grooves and marginal seats, a shell having its terminals in engagement with the seats, spokes projecting through the orifices and engaging the grooves and having their inner terminals held in engagement with the hubs, and an axle for holding the heads detachably assembled.

5. In a hose-reel, a drum comprising heads, each of which is provided with a centrally-disposed hub, with circumferential orifices, interior grooves and a marginal seat, a shell having its terminals resting in the seats, spokes projecting through the orifices and engaging the grooves and having their inner terminals bearing against the hub, a washer rigidly secured upon the hub and holding the spokes in position, and an axle for holding the heads detachably combined.

6. A reel comprising a drum consisting of a pair of heads each of which is provided with interior grooves, circumferential orifices and a marginal seat, a shell engaging the seats, spokes extending through the orifices and engaging the grooves, and rims through which the outer ends of the spokes project and are held against movement by engagement with the inner walls thereof.

7. In a hose-reel, a drum comprising heads having centrally-disposed tapered hubs, circumferential orifices, interior grooves and marginal seats, a shell having its terminals in engagement with the seats, spokes projecting through the orifices and engaging the grooves and having their inner terminals in engagement with the hubs, washers secured to the hubs and bearing against the spokes, and an axle for holding the heads detachably assembled.

8. In a hose-reel, a drum comprising heads having centrally-disposed tapered hubs, circumferential orifices, interior grooves and marginal seats, a longitudinally-corrugated shell having its terminals in engagement with the seats, spokes projecting through the orifices and engaging the grooves and having their inner terminals in engagement with the hubs, washers secured to the hubs and bearing against the spokes, and an axle for holding the heads detachably assembled.

In testimony that we claim the foregoing as our own we have hereto affixed our signatures in the presence of two witnesses.

REUBEN D. WIRT.
CHARLES R. PARKER.

Witnesses:
EDITH E. WIRT,
JOSEPH THOMASSON.